Dec. 7, 1965 A. W. MILLWARD 3,221,580
STOCK STOP
Filed May 1, 1963 3 Sheets-Sheet 1

INVENTOR.
ARTHUR W. MILLWARD
BY *Woodling, Krost,*
*Granger and Rust*
ATTORNEYS

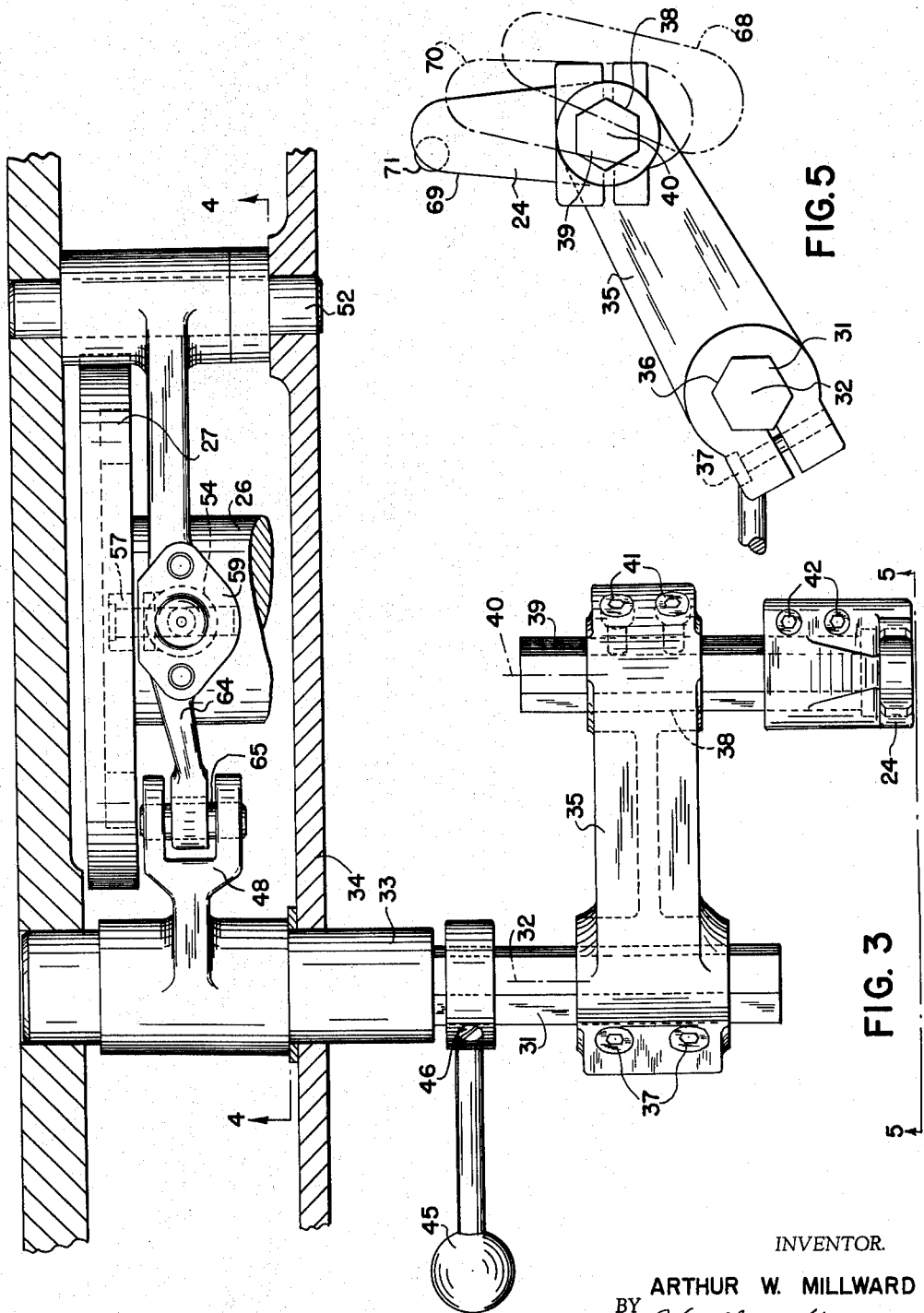

Dec. 7, 1965        A. W. MILLWARD        3,221,580
STOCK STOP
Filed May 1, 1963        3 Sheets-Sheet 3
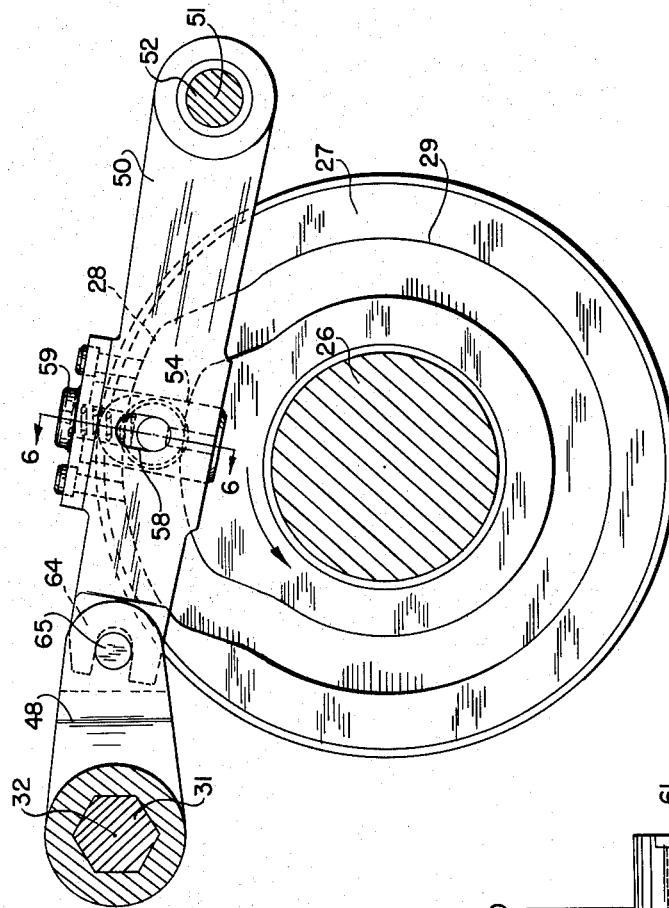
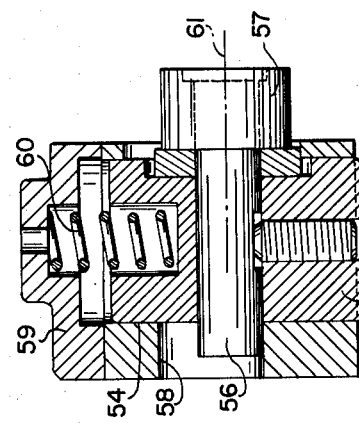
INVENTOR.
ARTHUR W. MILLWARD
BY Woodling, Krost,
Granger and Rust
ATTORNEYS United States Patent Office 3,221,580
Patented Dec. 7, 1965

3,221,580
STOCK STOP
Arthur W. Millward, Cleveland, Ohio, assignor to The National Acme Company, a corporation of Ohio
Filed May 1, 1963, Ser. No. 277,389
9 Claims. (Cl. 82—34)

The invention relates in general to stock stops and, more particularly, to a manually and automatically movable stock stop for use with a multiple spindle automatic bar machine. In multiple spindle automatic bar machines, the bar stock is in long lengths which is fed periodically through the collets of the multiple spindles in a stock feed position of the spindles. The stock is fed forward against a stock stop which is moved into a stock limiting position at that particular time in the machine cycle. A stock depletion signal may be fitted to machine tools to indicate if the stock has become too short to successfully produce a workpiece of the required length. Also, this prevents the short piece of stock from damaging the machine or tools should the collet attempt to grip on too short an end of the stock. Also, in many cases, the ends of the stock have been tapered or made conical in order to help the entrance of the stock into the feed mechanism. If the collet attempts to grip on such a tapered end of the stock, it might not be able to satisfactorily grip this end of the stock to drive it concentrically, and thus, this could damage the machine. The stock depletion signal automatically operates when the stock is of a sufficiently short length and the machine will shut down with the collet open. The short piece must be removed from the spindle at this stock feed position but in some cases the remaining piece of stock can be too long to be withdrawn from the collet and cleared past the stop.

Accordingly, an object of the invention is to provide a manually and automatically movable stock stop which overcomes the above recited disadvantages of not being able to remove the short end of stock.

Another object of the invention is to provide a manually and automatically movable stock stop for use with a multiple spindle automatic bar machine wherein the stock stop is automatically moved between two positions in alignment with and out of alignment with the stock and also may be manually moved to a position out of alignment with the stock in the stock feed position of the spindles.

Another object of the invention is to provide a manually and automatically movable stock stop wherein a lever system is used so that a cam moves a stock stop into and out of a limiting position and also a lever may also be connected to move the stock stop independent of motion of the cam and cam follower.

Another object of the invention is to provide a manually and automatically movable stock stop wherein a lever system is provided between a cam follower and a movable stock stop and also this lever system incorporates a spring urged lost motion means which lost motion means is normally not actuated by the cam but may be actuated by a manual handle to manually move the stock stop out of the limiting position.

The stock stop of the invention may be for use with a multiple spindle automatic bar machine having a spindle carrier with an axis and a stock feed position of the spindles and having a cam shaft and may comprise in combination a cam on said cam shaft having high and low points, a first shaft journalled on said frame on a first axis parallel to the spindle axis, a lever system including lever means connected to arcuately move said first shaft, a stock stop adjustably fixed axially relative to said first shaft, a handle connected to arcuately move said stock stop, a cam follower cooperating with said cam and connected to move said lever means, lost motion means in said lever system between said cam follower and said stock stop, spring means acting on said lost motion means, the low point of said cam moving said lever means to a position whereat said stock stop is at a first position out of axial alignment with the stock in the stock feed position of the spindles, said high point of said cam moving said lever means to have said stock stop in a second position in axial alignment with said stock in said stock feed position of said spindles, and said handle being arcuately movable against the urging of said spring means with said cam follower at the high point of said cam to move said stock stop to a position out of alignment with any stock in said stock feed position of said spindles.

Other objects and a fuller understanding of the invention may be had by referring to the following description and claims, taken in conjunction with the accompanying drawings, in which:

FIGURE 3 is a plan view of the stock stop mechanism in the bar machine;

FIGURE 4 is a sectional view on line 4—4 of FIGURE 3;

FIGURE 5 is a sectional view on line 5—5 of FIGURE 3; and,

FIGURE 6 is an enlarged sectional view on line 6—6 of FIGURE 4.

Figure 1:
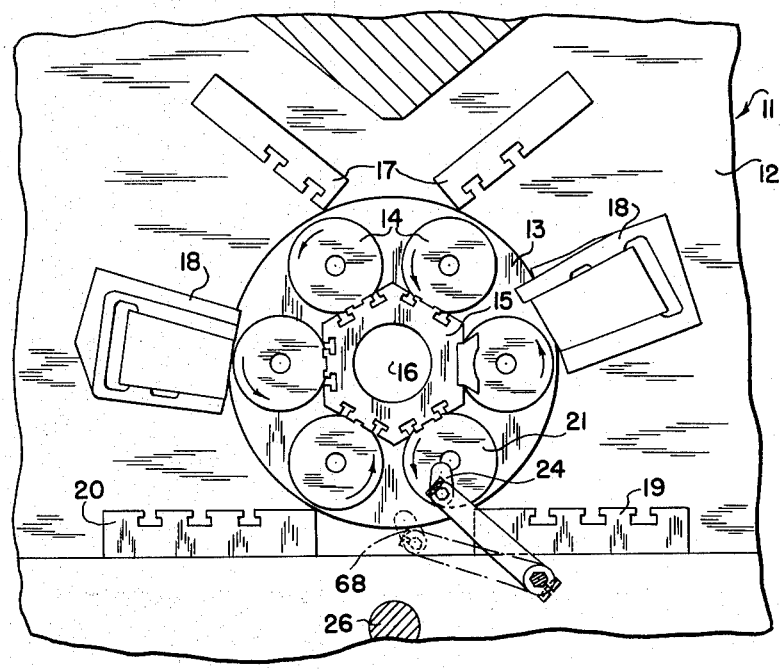
FIGURE 1 is a vertical sectional view through a multiple spindle automatic bar machine incorporating the invention.
Figure 2:
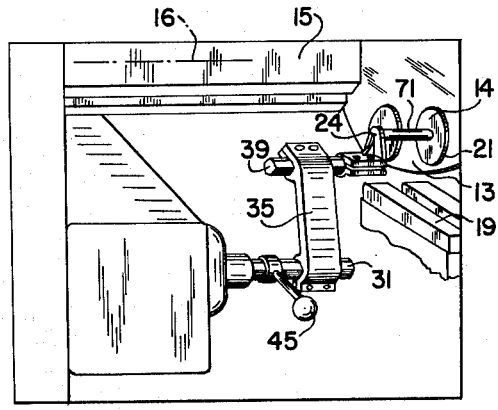
FIGURE 2 is a perspective view of a side of the machine of FIGURE 1 showing the stock stop in stock limiting position.

The stock stop of the present invention may be incorporated in a multiple spindle automatic bar machine 11 having a frame 12 which journals a spindle carrier 13. This spindle carrier carries a multiplicity of spindles 14, in this case shown as being six in number. An end tool slide 15 slides along the axis 16 of the spindle carrier and may carry tools for operating on stock carried in the spindles 14. Upper side slides 17, side slides 18 and lower side slides 19 and 20 carry tools to operate on stock carried in the spindles 14. The last position, or in this case, the sixth position of the spindles is designated as a stock feed position 21. The lower side slide 19 may carry a cut-off tool to cut off the completed workpiece in this sixth position and then the stock may be fed forward until it abuts a stock stop 24 in order to determine the proper length for the next workpiece to be cut from the long bar stock.

FIGURES 3, 4 and 5 better show the construction of the manually and automatically movable stock stop 24. The machine has a cam shaft 26 which is directly below and parallel to the axis 16 of the spindle carrier. This cam shaft rotates once per machine cycle to control the function of the various slides 15, 17, 18, 19 and 20. A disc cam 27 is fixed on the cam shaft 26 and has high and low points 28 and 29, respectively. A first shaft 31 is journalled on the frame 12 on a first axis 32 parallel to the cam shaft axis and spindle carrier axis and is disposed on a first side of the machine 11. A sleeve 33 is journalled in a wall 34 of the machine and has a hexagonal bore to receive the hexagonal first shaft 31. This assures that the sleeve 33 and shaft 31 turn together. A first lever 35 is adjustably fixed along the first shaft 31. A hexagonal bore 36 is provided in one end of the first lever 35 and this slides along the first shaft 31 and may be clamped thereto in adjustable positions by the screws 37. The outer end of the first lever 35 also has another hexagonal bore 38 in which a hexagonal second shaft 39 may be clamped by screws 41. This second shaft 39 has a second axis 40 parallel to the spindle carrier axis 16. The stock stop 24 may be adjustably clamped along the second shaft 39 and secured by means of screws 42.

A handle 45 may be adjustably fixed by a screw 46 along the first shaft 31. Turning the handle 45 will also arcuately move the first shaft 31. A second lever 48 is fixed to the sleeve 33 to rotate therewith and to also rotate with the first shaft 31.

A third lever or cam lever 50 is journalled relative to the machine frame 12 on a third axis 51 parallel to the spindle carrier axis 16 and this third lever 50 may be journalled on a shaft 52 carried in the wall 34 of the machine with this shaft 52 on a second side of the machine 11. An intermediate portion of the third lever 50 has a cylindrical bore 54 which journals a cylindrical slide 55. A cross pin 56 fixed in this slide 55 journals a cam follower roller 57. The cross pin 56 slides within an elongated slot 58 in the third lever 50, to retain the slide 55 within this lever 50. A spring retainer cap 59 is fixed to the lever 50 at one end of the bore 54. A coil compression spring 60 is disposed between the cap 59 and the slide 55 to urge the slide 55 downwardly toward the cam shaft 26, and more specifically toward the low point 29 of this cam 27.

The cross pin 56 has a fourth axis 61 which is parallel to the spindle carrier axis 16. The cam follower roller 57 cooperates with the disc cam 27 and rides in a groove which has the high and low points 28 and 29, respectively.

The outboard end of the third lever 50 has a yoke 64 which cooperates with a cross pin 65 on the outboard end of the second lever 48. This interconnects the second and third levers 48 and 50 for simultaneous arcuate movement.

The low point 29 on the cam 27 moves the third lever 50, the second lever 48 and the first lever 35 to a position where the stock stop 24 is at a first position 68 out of axial alignment with the stock in the stock feed position of the spindles. It will be noted from FIGURE 1 that this first position 68 is generally directly below the axis 16 of the spindle carrier 13 and thus this stock stop 24 is moved to a position out of the way of all tooling and slides in the machine 11. The high point 28 of the cam 27 moves the levers and the stock stop 24 to have the stock stop in a second position 69 which is a stock limiting position in axial alignment with the stock 71 in the stock feed position of the spindles. This second position 69 is the solid line position shown in FIGURES 1 and 5. The handle 45 may be arcuately moved upwardly against the urging of the spring 60 even though the cam follower roller 57 is at the high point 28 of the cam. This moves the stock stop 24 from the second position 69 to an intermediate position 70 between the first and second positions which intermediate position is out of alignment with any stock in the stock feed position of the spindles. This movement of the handle 45 is against the urging of the spring 60 and does not move the cam follower roller 57. The three levers 35, 48 and 50 do move however, because the slide 55 moves within the cylindrical bore 54. The movement of the slide 55 is a lost motion means and normally this lost motion means is not used when the stock stop 24 is automatically moved by the cam 27. However, this lost motion means comes into play when the handle is manually operated. Since the cam follower roller 57 is in a fixed position because of the cam 27, the three levers 35, 48 and 50 may only be moved against the urging of this spring 60. This moves the stock stop 24 from the second position 69 to the intermediate position 70 and thus the stock stop 24 is out of alignment with any stock 71 in the stock feed position of the spindles.

The bar stock fed to the machine 11 is in long lengths, for example, 14 to 20 feet long, and the ends of this bar stock may be tapered or made conical in order to help its entrance into the feed mechanism of the machine. The machine is preferably fitted with a stock depletion signal which indicates if the stock is too short to successfully produce a workpiece of the required length. For example, if the point of cut-off is 3/8 inch in front of the collet and the cut-off tool is 1/16 inch thick and the piece is 1½ inches long, then the stock stop 24 will be set at a distance of 3/8 inch plus 1/16 inch plus 1½ inches equals 1 15/16 inches. If the stock should be gripped along 3/4 inch of its length in the collet and up to ½ inch of the bar stock might happen to be tapered, then the stock depletion switch might be set for example at 3/4 inch plus ½ inch plus 1 15/16 inches equals 3 3/16 inches. Now if the last portion of the stock happens to be 3 inches long, for example, the stock depletion switch would signal this was too short since 3 3/16 inches is needed. The machine would shut down with the collet open and with the cam follower roller 57 at the high point 28 of the cam 27. This would mean that the stock stop 24 is in alignment in the second positon 69 with the stock. However, there is not much clearance between an open collet and the bar stock and this 3 inch long remaining piece of stock would be difficult to extract from the open collet past the stock stop which is set at only 1 15/16 inches. This is where the present invention comes into play because the handle 45 may be pivoted upwardly and then the stock stop 24 will be moved to the intermediate position 70. This moves it out of alignment with the spindle in the sixth position and hence the short remaining piece of stock may be easily removed from the spindle.

It will be noted that the first, second and third levers 35, 48 and 50 have a mechanical disadvantage in the order of 1:4, to establish movement of the stock stop 24, approximately four times the movement of the cam follower 57 between high and low points 28 and 29. This establishes movement of the stock stop 24 between the second position 69 and the intermediate position 70 approximately four times the movement of the slide 55 as it is limited by the cross pin 56 in the elongated slot 58. This establishes a relatively short journalled length of the slide 55 in the lever 50. Because of this short journalled length of the slide 55, the slide itself need not be made very long and, hence, this provides a compact and sturdy construction permitting close tolerances for closely controlled movement of the slide 55.

The lost motion means comprising the slide 55 and its sliding movement in the third lever 50 is connected in the lever system which includes the first, second and third levers 35, 48 and 50, respectively. This lost motion means is connected between the cam follower roller and the handle 45 and there is no lost motion means between the handle 45 and the stock stop 24. This permits the construction wherein the cam may move the stock stop and also the handle may move the stock stop independently of the cam, as desired. The first, second and third levers 35, 48 and 50 are lever means moved by the cam 27 and cam follower 57 to move the stock stop 24 in an arcuate movement.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine having a spindle rotatable about an axis, the improvement comprising in combination, a cam having high and low points,
  a first shaft journalled for rotation about a first axis parallel to the spindle axis,
  a lever system including a first lever and a cam lever, said first lever being fixed on said first shaft,
  a second shaft fixed on the outboard end of said first lever and having a second axis parallel to said first axis, a stock stop adjustably fixed axially along said second shaft, a handle connected to pivotally move said first lever, said cam lever being journalled for rotation about a third axis parallel to said first axis, a cam follower cooperating with said cam, lost motion means carrying said cam follower, spring means acting between said cam lever and said lost motion means, means connecting the outboard end of said cam lever to pivotally move said first shaft with arcuate movement of said cam lever, the low point of said cam moving said levers to a position whereat said stock stop is at a first position out of axial alignment with the spindle, said high point of said cam moving said levers to have said stock stop in a second position in axial alignment with the spindle, and said handle being arcuately movable against the urging of said spring means with said cam follower at the high point of said cam to move said stock stop to an intermediate position between said first and second positions out of alignment with the spindle.

2. A stock stop assembly comprising, in combination, a cam having high and low points, a first shaft journalled for rotation about a first axis parallel to said spindle axis, a first lever fixed on said first shaft, a second shaft fixed on the outboard end of said first lever and having a second axis parallel to said first axis, a stock stop adjustably fixed axially along said second shaft, a handle connected to arcuately move said first lever, a cam lever journalled for rotation about a third axis parallel to said first axis, a cam follower movably connected to said cam lever for movements toward and from the high and low points of said cam, spring means between said cam lever and said cam follower and urging said cam follower toward the low point of said cam, said cam follower cooperating with said cam, means connecting the outboard end of said cam lever to pivotally move said first shaft with arcuate movement of said cam lever, the low point of said cam moving said levers to a position whereat said stock stop is at a first inactive position, said high point of said cam moving said levers to have said stock stop in a second active position, and said handle being arcuately movable against the urging of said spring means with said cam follower at the high point of said cam to move said stock stop to an intermediate inactive position between said first and second positions.

3. In a machine having a spindle rotatable about an axis, the improvement comprising, in combination, a cam having high and low points, a first shaft journalled for rotation about a first axis parallel to the spindle axis, lever means connected to pivotally move said first shaft, a second shaft fixed on said lever means and having a second axis parallel to said first axis, a stock stop adjustably fixed axially along said second shaft, a handle fixed to said first shaft to pivotally move same, a cam follower roller movably connected to said lever means for movements toward and from the high and low points of said cam, spring means between said lever means and said cam follower roller and urging said roller toward the low point of said cam, said cam follower roller cooperating with said cam, the low point of said cam moving said lever means to a position whereat said stock stop is at a first position out of axial alignment with the spindle, said high point of said cam moving said lever means to have said stock stop in a second position in axial alignment with the spindle, and said handle being arcuately movable against the urging of said spring means with said cam follower at the high point of said cam to move said stock stop to an intermediate position between said first and second positions out of alignment with the spindle.

4. A stock stop assembly, comprising in combination, a cam having high and low points, a first shaft journalled for rotation about a first axis, lever means connected to said first shaft, a second shaft fixed on said lever means and having a second axis parallel to said first axis, a stock stop adjustably fixed axially along said second shaft, a handle fixed to said first shaft to pivotally move same, a slide journalled in said lever means for sliding movements toward and from the high and low points of said cam, spring means between said lever means and said slide and urging said slide toward the low point of said cam, a cam follower roller journalled on said slide parallel to said first axis and cooperating with said cam, the low point of said cam moving said lever means to a position whereat said stock stop is at a first inactive position, said high point of said cam moving said lever means to have said stock stop in a second active position, and said handle being arcuately movable against the urging of said spring means with said cam follower at the high point of said cam to move said stock stop to an intermediate inactive position between said first and second positions.

5. In a machine having a spindle rotatable about an axis, the improvement comprising in combination, a cam having high and low points, a first shaft journalled for rotation about on a first axis parallel to the spindle axis, a first lever fixed on said first shaft, a second shaft fixed on the outboard end of said first lever and having a second axis parallel to said first axis, a stock stop adjustably fixed axially along said second shaft, a handle fixed to said first shaft to pivotally move same, a cam lever journalled for rotation about a third axis parallel to said first axis, a slide journalled in said cam lever for sliding movements toward and from the high and low points of said cam, spring means between said cam lever and said slide and urging said slide toward the low point of said cam, a cam follower roller journalled on said slide on a fourth axis parallel to said first axis and cooperating with said cam, means connecting the outboard end of said cam lever to pivotally move said first shaft with arcuate movement of said cam lever, the low point of said cam moving said levers to a position whereat said stock stop is at a first position out of axial alignment with the spindle, said high point of said cam moving said levers to have said stock stop in a second position in axial alignment with the spindle, and said handle being arcuately movable against the urging of said spring means with said cam follower at the high point of said cam to move said stock stop to an intermediate position between said first and second positions out of alignment with the spindle.

6. A stock stop assembly comprising in combination, a cam having high and low points,
- a first shaft journalled for rotation about a first axis,
- a first lever fixed on said first shaft,
- a second shaft fixed on the outboard end of said first lever and having a second axis parallel to said first axis,
- a stock stop adjustably fixed axially along said second shaft,
- a handle fixed to said first shaft to pivotally move same,
- a sleeve fixed on said first shaft and having a second lever fixed thereon,
- a third lever journalled for rotation about a third axis parallel to said first axis,
- a slide journalled in said third lever for sliding movements toward and from the high and low points of said cam,
- spring means between said third lever and said slide and urging said slide toward the low point of said cam,
- a cam follower roller journalled on said slide on a fourth axis parallel to said first axis and cooperating with said cam,
- yoke means interconnecting the outboard ends of said second and third levers to arcuately pivot said second lever with arcuate movement of said third lever,
- the low point of said cam moving said third, second and first levers to a position whereat said stock stop is at a first inactive position,
- said high point of said cam moving said third, second and first levers to have said stock stop in a second active position,
- and said handle being arcuately movable against the urging of said spring means with said cam follower at the high point of said cam to move said stock stop to an intermediate inactive position between said first and second positions.

7. In a machine having a spindle rotatable about an axis, the improvement comprising, in combination, a cam having high and low points,
- a first shaft journalled for rotation about a first axis parallel to the spindle axis,
- a first lever fixed on said first shaft,
- a second shaft fixed on the outboard end of said first lever and having a second axis parallel to said first axis,
- a stock stop adjustably fixed axially along said second shaft,
- a handle fixed to said first shaft to pivotally move same,
- a sleeve fixed on said first shaft and having a second lever fixed thereon,
- a third lever journalled for rotation about a third axis parallel to said first axis,
- a slide journalled in said third lever for sliding movements toward and from the high and low points of said cam,
- spring means urging said slide toward the low point of said cam,
- a cam follower roller journalled on said slide on a fourth axis parallel to said first axis and cooperating with said cam,
- a yoke on the outboard end of said third lever cooperating with the outboard end of said second lever to arcuately pivot same,
- the low point of said cam moving said third, second and first levers to a position whereat said stock stop is at a first position out of axial alignment with the spindle,
- said high point of said cam moving said third, second and first levers to have said stock stop in a second position in axial alignment with the spindle,
- and said handle being arcuately movable against the urging of said spring means with said cam follower at the high point of said cam to move said stock stop to an intermediate position between said first and second positions out of alignment with the spindle.

8. A stock stop assembly, comprising in combination, a disc cam having high and low points,
- a first shaft journalled for rotation about a first axis,
- a first lever fixed on said first shaft,
- a second shaft fixed on the outboard end of said first lever and having a second axis parallel to said first axis,
- a stock stop adjustably fixed axially along said second shaft,
- a handle fixed to said first shaft to pivotally move same,
- a sleeve fixed on said first shaft and having a second lever fixed thereon,
- a third lever journalled for rotation about a third axis parallel to said first axis,
- a slide journalled in said third lever for sliding movements toward and from said cam and generally perpendicular to said third axis,
- a spring retainer cap fixed on said third lever and disposed at one axial end of said slide,
- a compression spring between said cap and said slide and urging said slide toward said cam,
- a cam follower roller journalled on said slide on a fourth axis parallel to said first axis and cooperating with said disc cam,
- a yoke on the outboard end of said third lever cooperating with the outboard end of said second lever to arcuately pivot same,
- the low point of said cam moving said third, second and first levers to a position whereat said stock stop is at a first inactive position,
- said high point of said cam moving said third, second and first levers to have said stock stop in a second active position,
- and said handle being arcuately movable against the urging of said compression spring with said cam follower at the high point of said cam to move said stock stop to an intermediate inactive position between said first and second positions.

9. In a machine having a spindle rotatable about an axis, the improvement comprising in combination, a disc cam having high and low points,
- a first shaft journalled for rotation about a first axis parallel to the spindle axis,
- a first lever fixed on said first shaft,
- a second shaft fixed on the outboard end of said first lever and having a second axis parallel to said first axis,
- a stock stop adjustably fixed axially along said second shaft,
- a handle fixed to said first shaft to pivotally move same,
- a sleeve fixed on said first shaft and having a second lever fixed thereon,
- a third lever journalled for rotation about a third axis parallel to said first axis,
- a slide journalled in said third lever for sliding movements toward and from said cam and generally perpendicular to said third axis,
- a spring retainer cap fixed on said third lever and disposed at one axial end of said slide,
- a compression spring between said cap and said slide and urging said slide toward said cam,
- a cam follower roller journalled on said slide on a fourth axis parallel to said first axis and cooperating with said disc cam,
- a yoke on the outboard end of said third lever cooperating with the outboard end of said second lever to arcuately pivot same,
- the low point of said cam moving said third, second and first levers to a position whereat said stock stop is at a first position out of axial alignment with the spindle,
- said high point of said cam moving said third, second and first levers to have said stock stop in a second position in axial alignment with the spindle, said handle being arcuately movable against the urging of said compression spring with said cam follower at the high point of said cam to move said stock stop to an intermediate position between said first and second positions out of alignment with the spindle, and said third, second and first levers having a mechanical disadvantage in the order of 1:4 to establish movement of said stock stop approximately four times the movement of said cam follower between high and low points of said cam and to establish movement of said stock stop between said second and intermediate positions approximately four times the movement of said slide in said third lever, thereby establishing a relatively short journalled length of said slide in said third lever.

References Cited by the Examiner

UNITED STATES PATENTS

| | | |
|---|---|---|
| 2,617,175 | 11/1952 | Drissner. |
| 2,742,656 | 4/1956 | Fischer _____ 82—2.7 X |
| 2,964,982 | 12/1960 | Jobert. |

FOREIGN PATENTS

| | | |
|---|---|---|
| 639,474 | 12/1936 | Germany. |

WILLIAM W. DYER, Jr., *Primary Examiner.*